United States Patent [19]

Miyoshi et al.

[11] Patent Number: 5,278,283

[45] Date of Patent: Jan. 11, 1994

[54] PROCESS FOR PREPARING POLYARYLENE SULFIDES OF INCREASED MOLECULAR WEIGHT

[75] Inventors: Akira Miyoshi; Minoru Senga, both of Ichihara, Japan

[73] Assignee: Idemitsu Petrochemical Company, Limited, Tokyo, Japan

[21] Appl. No.: 819,680

[22] Filed: Jan. 13, 1992

Related U.S. Application Data

[63] Continuation of Ser. No. 546,226, Jun. 29, 1990, abandoned.

[30] Foreign Application Priority Data

Jun. 30, 1989 [JP] Japan .................... 1-168779

[51] Int. Cl.$^5$ ............................................. C08G 75/14
[52] U.S. Cl. ........................................ 528/388; 528/389; 264/331.11
[58] Field of Search ............................. 528/388, 389; 264/331.11

[56] References Cited

U.S. PATENT DOCUMENTS

| | | | |
|---|---|---|---|
| 3,354,129 | 11/1967 | Bayer | 528/265 |
| 4,066,632 | 1/1978 | Anderson et al. | 528/388 |
| 4,500,702 | 2/1985 | Ostlinning et al. | 528/388 |
| 4,595,748 | 6/1986 | Ostlinning et al. | 528/388 |
| 4,631,336 | 12/1986 | Idel et al. | 528/388 |
| 4,645,825 | 2/1987 | Idel et al. | 528/388 |
| 4,661,584 | 4/1987 | Idel et al. | 528/388 |
| 4,665,156 | 5/1987 | Reinking et al. | 528/388 |
| 4,732,967 | 3/1988 | Idel et al. | 528/388 |
| 4,900,808 | 2/1990 | Idel et al. | 528/388 |
| 5,030,641 | 7/1991 | Simon et al. | 514/345 |

FOREIGN PATENT DOCUMENTS

| | | |
|---|---|---|
| 59-98133 | 6/1984 | Japan . |
| 59-105027 | 6/1984 | Japan . |
| 60-212429 | 10/1985 | Japan . |
| 2-45531 | 2/1990 | Japan . |

Primary Examiner—John Kight, III
Assistant Examiner—Richard Lee Jones
Attorney, Agent, or Firm—Nikaido, Marmelstein, Murray & Oram

[57] ABSTRACT

Disclosed is a process for preparing a polyarylene sulfide, which involves polycondensing a dihalogenated aromatic compound with a source of sulfur in an organic polar solvent while dehydrating at pressure under which polycondensation is performed. This process avoids dehydration operation of the raw materials, particularly the source of sulfur, prior to polycondensation, thereby resulting in the production of the polyarylene sulfide having a high molecular weight.

15 Claims, No Drawings

PROCESS FOR PREPARING POLYARYLENE SULFIDES OF INCREASED MOLECULAR WEIGHT

This application is a continuation of application Ser. No. 546,226, filed Jun. 29, 1990, now abandoned.

BACKGROUND OF THE INVENTION

1. Field of the Invention

The present invention relates to a process for preparing polyarylene sulfides and, more particularly, to a process for preparing polyarylene sulfides having a high molecular weight and high stability, in which a surplus of water can readily be removed from a polycondensation system by means of a simplified dehydration operation and apparatus.

2. Description of the Related Art

Polyarylene sulfides, such as polyphenylene sulfides having a recurring unit as represented by formula:

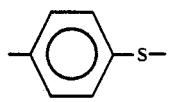

are mostly thermoplastic resins, which have partial thermosetting chracteristic. They have excellent properties as engineering plastics, such as high chemical resistance, mechanical properties over a wide range of temperatures, and thermal rigidity.

Such polyarylene sulfides can generally be prepared by polycondensing a dihalogenated aromatic compound with a sulfur source (a sulfur compound) in an organic polar solvent. As the sulfur source, there may be used mainly an alkali metal sulfide or hydrosulfide, particularly sodium sulfide or sodium hydrosulfide. The alkali metal sulfides and hydrosulfides are industrially available in the form of a hydrate or an aqueous mixture in many cases. Hence, the use of such industrially available alkali metal sulfides provides the polycondensation system for synthesizing the polyarylene sulfides with water, too, thereby resulting in a decrease in molecular weight of the resulting products and an increase in a content of impurities within the resulting products. Such polyarylene sulfides are poor in thermal resistance, resistance to ultraviolet rays and so on, so that they cannot be formed into films, sheets, fibers and moldings with high physical properties. Therefore, dehydration operation has conventionally been performed, for example, by using a stream of nitrogen, prior to polycondensation in order to avoid such drawbacks.

The dehydration operation in a nitrogen stream, however, suffers from the disadvantages that, when it is performed at low temperatures, on the one hand, a long period of time is required for dehydration so that it is not available on an industrial basis and, when it is carried out at high temperatures, on the other hand, the raw materials may be caused to be decomposed. Thus, the dehydration operation has been carried out in a nitrogen stream at mild temperature conditions, however, this dehydration results in the presence of a water residue in the amount ranging from 1 mole to 1.5 moles per mole of the sulfur source used within the system.

A process for controlling the amount of water residue to less than 1 mole prior to polycondensation is proposed, for example, by Japanese Patent Unexamined Publication (kokai) No. 98,133/1984, which is directed to a process for preparing polyphenylene sulfides having a recurring unit as represented by formula:

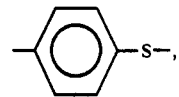

involving reacting a p-dihalo- benzene with a source of sulfur in a polar solvent of an organic amide type in such a state that the water content in the system is controlled to 0.3–0.95 mole per mole of sulfur. This process, however, requires dehydration of the system to be carried out prior to addition of the p-dihalobenzene to the polycondensation system, and the dehydration operation is performed by distillation so as to reduce the amount of the water content within the system prior to polycondensation to 0.3–0.95 mole per mole of sulfur. This publication states the reasons for adjusting the water content in the system within the predetermined scope prior to polycondensation, because if the water content remaining within the system would be lower than 0.3 mole per mole of sulfur, on the one hand, the degree of polycondensation of the resulting polyphenylene sulfide is unlikely to be raised, thereby leading to the preparation of polyphenylene sulfides which are not very suitable for molding and so on. The polyphenylene sulfides with such a low degree of polycondensation requires its apparent melt viscosity to be raised by means of cross-linking or the like, however, such polyphenylene sulfides as having an elevated apparent melt viscosity is likely to deteriorate. This publication also states that, if polycondensation would be carried out in such a system that the water content remains in the system Prior to polycondensation in the amount as high as more than 0.95 mole per mole of sulfur, on the other hand, polyphenylene sulfides result which contain an increased amount of oligomers so that oxidative cross-linkability, decomposition and cross-linkability upon exposure to ultraviolet rays, and deterioration by heat may be increased. It further states that distillation may preferably be carried out by means of a fractionating column or tower. As disclosed in the above publication, the process has the problems that a special apparatus such as the fractionating column or tower is required and that it takes a long period time for dehydration.

Further, our copending Japanese Patent Applications No. 195,844/1988 (Unexamined Publication (kokai) No. 45,531/1990) discloses improvements in processes for dehydration, which involve controlling the water content in the system prior to polycondensation to less than 1 mole per mole of a sulfur source by means of a dehydration operation under reduced pressures or by using a dehydrating column or the like. These improved processes, however, still have room for an improvement in terms of application of reduced pressures to the dehydration process and the use of a special device such as a dehydrating column or the like.

A further aspect of the process for preparing polyarylene sulfides is disclosed in Japanese Patent Unexamined Publication (kokai) No. 212,429/1985, which involves carrying out an optionally continuous reaction in a cascade reactor system consisting of two to six reactors under optionally elevated pressures so as to remove water in the mixture prior to reaction or in a preparatory step for the reaction in the presence of all reaction components and then continuously elevating the reaction temperature for each of the individual reactors. As will be apparent from the foregoing description, too, this process suffer from the disadvantage that a plurality of reactors are required, thereby resulting in a, complexity of the construction of the system as a whole, for which control is so complicated as to continuously elevate the temperatures for the individual reactors.

A still further aspect of the process for preparing polyarylene sulfides is disclosed in Japanese Patent Unexamined Publication (kokai) No. 105,027/1984, which involves carrying out the reaction step in a batchwise manner constantly under slightly higher pressure in a mole ratio of an alkali metal sulfide to an organic solvent of 1:2 to 1:15 and removing water from the reaction mixture azeotropically. This publication further states that the reaction be batchwise carried out by heating the reaction mixture at 160° to 270° C. Actually, when a solvent having a relatively low boiling point, such as N-methylpyrrolidone, is used as an organic solvent, however, a limit should be placed upon this process in terms of the temperature for polycondensation because this reaction should be carried out under substantially ambient pressure, although under slightly elevated pressure. This process further has the technical difficulty that it requires a long time period for polycondensation. Furthermore as is apparent from the working examples disclosed in this publication, this process require dehydration prior to polycondensation at temperatures as substantially high as boiling points of the solvents for polycondensation used and thereafter polycondensation for a long period of time. Hence, this process eventually is not very different from the process as disclosed in Japanese Patent Unexamined Publication No. 212,429/1985 which requires a plurality of the reactors as described hereinabove.

Briefly speaking, such conventional processes as described hereinabove are all based on the basic concept that water contained in the source of sulfur be removed prior to polycondensation.

SUMMARY OF THE INVENTION

Therefore, the present invention has been completed under circumstances as described hereinabove and has as one of its object to provide a process for preparing polyarylene sulfides, which can omit dehydration prior to polycondensation.

The present invention has another object to provide a process for preparing polyarylene sulfides, wherein a dehydration operation is carried out under the conditions under which polycondensation is performed, together with the polycondensation operation, a the dehydration operation being conventionally considered difficult to be implemented to such an extent that the water content remaining in the system be lower than 1 mole per mole of the sulfur source used. This process can provide polyarylene sulfides which are high in molecular weight and stability, by means of a simplified reaction system.

In order to achieve the objects, the present invention is characterized in that the dihalogenated aromatic compound is subjected to polycondensation with the source of sulfur in an organic solvent while dehydration is performed under the conditions of polycondensation.

Other objects, features and advantages of the present invention will become apparent in the course of the description of the preferred embodiments, which follow.

DESCRIPTION OF THE PREFERRED EMBODIMENTS

The present invention will be described more in detail.

Raw Materials

As the organic polar solvent to be used for the present invention there may be used a non-protonic organic solvent such as an amide compound, a lactam compound, a urea compound, and a cyclic organophosphorus compound.

The amide compound may include, for example, N,N-dimethylformamide, N,N-dimethylacetamide, N,N-diethylacetamide, N,N-dipropylacetamide, and N,N-dimethylbenzoic amide.

The lactam compound may include, for example, caprolactam, N-methylcaprolactam, N-ethylcaprolactam, N-n-propylcaprolactam, N-isopropylcaprolactam, N-n-butylcaprolactam, N-isobutylcaprolactam, N-cylcohexylcaprolactam, N-methyl-2-pyrrolidone, N-ethyl-2-pyrrolidone, N-n-propyl-2-pyrrolidone, N-isopropyl-2-pyrrolidone, N-n-butyl-2-pyrrolidone, N-isobutyl-2-pyrrolidone, N-cyclohexyl-2-pyrrolidone, N-methyl-3-methyl-2-pyrrolidone, N-ethyl-3-methyl-2-pyrrolidone, N-methyl-3,4,5- trimethyl-2-pyrrolidone, N-methyl-2-piperidone, N-ethyl-2-piperidone, N-propyl-2-piperidone, N-isopropyl-2-piperidone, N-methyl-6-methyl-2-piperidone and N-methyl-3-ethyl-2-piperidone.

As the urea compounds, there may be used, for example, tetramethyl urea, N,N'-dimethylethylene urea and N,N'-dimethylpropylene urea.

The cyclic organophosphorus compound may include, for example, 1-methyl-1-oxosulphorane, 1-ethyl-1-oxosulphorane, 1-phenyl-1-oxosulphorane, 1-methyl-1-oxophosphorane, 1-n-propyl-1-oxophosphorane and 1-phenyl-1-oxophosphorane.

Among the organic polar solvents, an N-alkyllactam and an N-alkylpyrrolidone are preferred, and N-methylpyrrolidone is more preferred.

These solvents may be used singly or in combination of two or more.

As the source of sulfur, there may be used an alkali metal sulfide, an alkali metal hydrosulfide, hydrogen sulfide and so on.

The alkali metal sulfide may include, for example, lithium sulfide, sodium sulfide, potassium sulfide, rubidium sulfide and cesium sulfide. Sodium sulfide and lithium sulfide are preferred, and sodium sulfide is more preferred.

The alkali metal sulfide may be used singly or in combination of two or more.

The alkali metal sulfide to be used for the present invention may be the one which is obtainable by reacting an alkali metal hydrosulfide with a base. Hence, it is possible to use the alkali metal hydrosulfide and the base in place of or together with the alkali metal sulfide. It is further noted that hydrogen sulfide may be used as the source of sulfur and that hydrogen sulfide may be used with the base together with the alkali metal sulfide and/or the alkali metal hydrosulfide.

The alkali metal hydrosulfide to be used for this purpose may include, for example, lithium hydrosulfide, sodium hydrosulfide, potassium hydrosulfide, rubidium hydrosulfide and cesium hydrosulfide. The alkali metal hydrosulfide may be used singly or in combination of two or more. Sodium hydrosulfide and lithium hydrosulfide are preferred, and sodium hydrosulfide is more preferred.

The proportion of the sulfur source to be used may be such that the organic polar solvent is used in a proportion ranging usually from 1 to 20 moles, preferably from 2 to 10 moles, per mole of the sulfur atom in the sulfur source. If the organic polar solvent is less than the lower limit, on the one hand, the reaction may not proceed to a sufficient extent. If it is higher than the upper limit, on the other hand, efficiency in volume will be worsened, thereby reducing productivity.

The base to be used may be of an inorganic or organic type if it is an acid receptor which can convert the alkali metal hydrosulfide into the alkali metal sulfide, convert the hydrogen sulfide into the alkali metal hydrosulfide, or effectively neutralize or receive a hydrogen halide producible by condensation of the alkali metal hydrosulfide or hydrogen sulfide with the dihalogenated aromatic compound, as will be described hereinafter, and which does not adversely affect the object of the present invention. An alkali metal hydroxide or the like may preferably be used as the base.

Specific representatives of the alkali metal hydroxide may include, for example, lithium hydroxide, sodium hydroxide, potassium hydroxide, rubidium hydroxide and cesium hydroxide. Lithium hydroxide and sodium hydroxide are preferred, and sodium hydroxide is more preferred. The base of the organic type may be a metal salt of ω-hydroxycarboxylic acid and an alkali metal aminoalkanoate. These bases may be used singly or in combination of two or more.

The base may be used in a proportion ranging usually from 0.80 mole to 1.2 moles per mole of the total hydrogen atoms of the alkali metal hydrosulfide and hydrogen sulfide.

As the alkali metal sulfide and the alkali metal hydrosulfide, there may be used one of industrial grade having hydrated water in the amount of 2.6 to 9 moles per mole of the alkali metal sulfide or hydrosulfide. In using such an industrial grade chemical, however, it is possible to add an appropriate amount of water if the amount of hydrated water would be less than 1.2 moles per mole of the alkali metal sulfide or the alkali metal hydrosulfide.

In accordance with the present invention, it can be noted that a small amount of water is preferably present in the system prior to polycondensation. This can be said true particularly when a polymerization aid or promoter is used.

As the polymerization aid or promoter, there may appropriately be used a lithium halide or an alkali metal carboxylate. Specifically, it may include for example lithium chloride, lithium fluoride, lithium acetate and sodium acetate. Sodium chloride is particularly preferred.

The polymerization aid or promoter may be used in a proportion ranging usually from 0.05 to 2.0 moles, preferably from 0.1 to 1.2 moles, per mole of sulfur atom in the sulfur source. If the polymerization aid or promoter would be used at the rate smaller than the lower limit, on the one hand, addition of the polymerization aid or promoter may not produce the expected effects to a sufficient extent so that the reaction does not proceed at a sufficient reaction speed, the resulting polyarylene sulfides may not have a sufficiently high molecular weight or purity. If the rate of the polymerization aid or promoter would exceed the upper limit, on the other hand, the effects compensated by addition of such a large amount of the polymerization aid or promoter may not be expected, thereby making a cost of production expensive and uneconomical.

The dihalogenated aromatic compound to be used for the present invention may be any conventional one and may include, for example, a dihalobenzene such as m-dihalobenzene and p-di-halobenzene; an alkyl-substituted dihalobenzene such as 2,3-di-halotoluene, 2,5-dihalotoluene, 2,6-dihalotoluene, 3,4-dihalo-toluene, 2,5-dihaloxylene, 1-ethyl-2,5-dihalobenzene, 1,2,4,5-tetramethyl-3, 6-dihalobenzene and 1-n-hexyl-2,5-dihalobenzene; a cycloalkyl-substituted dihalobenzene such as 1-cyclohexyl-2,5-dihalobenzene; an aryl-substituted dihalobenzene such as 1-phenyl-2,5-dihalobenzene, 1-benzyl-2,5-dihalobenzene and 1-p-toluyl-2,5-dihalobenzene; a dihalobiphenyl such as 4,4'-dihalo- biphenyl; and a dihalonaphthalene such as 2,4-dihalonaphthalene,1,6-dihalonaphthalene, and2,6-dihalonaphthalene.

The two halogene atoms in the dihalogenated aromatic compounds may be fluorine, chlorine, bromine or iodine and they may be the same or different from each other.

Dihalobenzenes are preferred, and p-dichlorobenzene and one containing 70% or more by mole of p-dichlorobenzene is particularly preferred.

The dihalogenated aromatic compound may be used at the rate ranging usually from 0.95 to 1.20 moles, preferably from 0.98 to 1.10 moles, per mole of sulfur atom in the sulfur source. If the rate of the dihalogenated aromatic compound would be smaller than the lower limit, by-products such as thiophenol may be produced. If the rate of the dihalogenated aromatic compound would exceed the upper limit, the molecular weight of the resulting polyarylene sulfide may be reduced.

If needed, together with the dihalogenated aromatic compound, there may be used a branching agent such as a halogenated aromatic compound containing an active-hydrogen, a polyhalogenated aromatic compound containing three halogen atoms or more in one molecule and a halogenated aromatic compound having nitro group or a molecular weight modifier such as a monohalogenated aromatic compound.

As the halogenated aromatic compound containing active-hydrogen is employed a halogenated aromatic compound with a functional group or groups, such as an amino group, mercapto group, hydroxyl group or the like. More specifically, the halogenated aromatic compound containing an active-hydrogen may include, for example, a dihaloaniline such as 2,6-dichloroani-line, 2,5-dichloroaniline, 2,4-dichloroaniline and 2,3-dichloro-aniline, a trihaloaniline such as 2,3,4-trichloroaniline, 2,3,5-trichloroaniline, 2,4,6-trichloroaniline and 3,4,5-trichloroani-line, a dihaloaminodiphenyl ether such as 2,2'-diamino-4,4'-dichlorodiphenyl ether and 2,4'-diamino-2',4-dichlorodiphenyl ether, and those in which the amino group is replaced by the other functional group such as the thiol group or the hydroxyl group.

There may also be used a halogenated aromatic compound containing active-hydrogen in which a hydrogen atom or atoms joined to the carbon atom or atoms forming its aromatic ring is or are replaced by another inert group or groups such as a carbohydryl group, i.e., an alkyl group.

Among the halogenated aromatic compounds containing active-hydrogen, the dihalogenated aromatic compound containing active-hydrogen is preferred. Dichloroaniline is more preferred.

As the polyhalogenated aromatic compound having three halogen atoms or more in one molecule, there may specifically be used 1,2,4-trichlorobenzene, 1,3,5-trichlorobenzene, 1,4,6-trichloronaphthalene.

The halogenated aromatic compound having nitro group may include, for example, a mono- or di-halonitrobenzene such as 2,4-dinitro-chlorobenzene or 2,5-dichloronitrobenzene, a dihalonitrodiphenylether such as 2-nitro-4,4'-dichlorodiphenyl ether, a dihalonitrodiphenyl sulfone such as 3,3'-dinitro-4,4'-dichlorodiphenylsulfone, a mono- or di-halonitropyridine such as 2,5-dichloro-3-nitropyridine or 2-chloro-3,5-dinitropyridine, or a dihalo- nitronaphthalene.

The monohalogenated aromatic compound may include, for example, chlorobenzene, bromobenzene, α-bromobenzene, α-chlorotoluene, o-chlorotoluene, m-chlorotoluene, p-chlorotoluene, α-bromotoluene, o-bromotoluene, m-bromotoluene, p-bromotoluene and so on.

By using these halogenated aromatic compound containing active-hydrogen, the polyhalogenated aromatic compound, the halogenated aromatic compound having nitro group or the like, the resulting polymer increases its degree of branching or molecular weight, thereby further improving their various properties.

In accordance with the process according to the present invention, the branching agent or the molecular weight modifier may be used singly or in combination of two or more.

Polycondensation

The process according to the present invention is carried out by charging the necessary raw materials in a hydrous state in a reactor, without subjecting them to dehydration prior to polycondensation.

The process involves polycondensing the dihalogenated aromatic compound with the source of sulfur in the organic polar solvent while dehydrating under pressure under which the polycondensation is carried out.

In accordance with the present invention, no dehydration operation is required prior to polycondensation, unlike conventional procedures, so that equipment can be simplified and the reaction causes no decrease in the properties of the resulting polyarylene sulfides, as will be described hereinafter. More specifically, the present invention has the great advantages and merits in that the raw materials can be used for polycondensation without dehydration, equipment can be simplified to a considerable extent by carrying out dehydration together with polycondensation, and the resulting polyarylene sulfides do not lead to a decrease in their properties.

The polycondensation may be carried out under pressure ranging usually from 2 to 10 kg per square centimeter.

The dehydration may be carried out in a stepwise manner, together with polycondensation, under the pressure under which the polycondensation is carried out. The dehydration may be performed at one time or in a multiple stage during polycondensation. In some cases, it is possible to preliminarily dehydrate a variety of the raw materials in advance under reduced pressure or under ambient pressure in a reactor in which the polycondensation is performed and thereafter to raise the pressure suitable for polycondensation so as to perform dehydration in a stepwise manner while allowing polycondensation.

It is to be noted, however, that dehydration may be performed prior to polycondensation if the water content exceeds 1.2 moles per one mole of the sulfur source which is readily dehydrated, in order to control the pressure for polycondensation.

The reaction temperature may range usually from 220+ C. to 300° C., preferably from 230° C. to 290° C. If the reaction temperature would be below the lower limit, on the one hand, the reaction velocity may become too slow to be practically applicable. If the reaction temperature would be over the upper limit, on the other hand, side reaction may occur and the resulting polymer may deteriorate, thereby resulting in coloration or gellation.

The reaction time may vary with the kind and amount of the various components and the polymerization aid or promoter, and it may range generally within 20 hours, preferably from 0.1 to 8 hours.

The polycondensation may be carried out in an ambient atmosphere of an inert gas such as nitrogen, argon or carbon dioxide.

The polycondensation may be a one-stage reaction in which the reaction is carried out at a stationary temperature or a multiple-stage reaction in which the reaction temperature is elevated in a stepwise manner or in a continuously ascending manner.

The system in which the polycondensation is performed together with dehydration in accordance with the process of the present invention may preferably comprise a series of equipment consisting of a reactor with a stirrer, in which the raw materials are charged and they are polycondensed while being dehydrated, a cooling tower in which the components distillated from the reactor are cooled, a receiver tank which receives the cooled components from the cooling tower, and control valves which can have the level of the solution and gas pressure held at a constant level. Of the distillates, the organic polar solvent and the dihalogenated aromatic compound may be circulated to the reactor.

As the polycondensation is performed under elevated pressure together with dehydration, the process according to the present invention undergoes no limit to the reaction temperature or a kind of the reaction mediums. Therefore, even if a solvent having a relatively low boiling point, such as N-methylpyrrolidone(NMP), would be used, the polycondensation can be performed within a short period of time without being bound to the reaction temperature. Although it is not clear as to the reason that the dehydration can readily be performed together with polycondensation in accordance with the process of the present invention, it is postulated that the sulfur source is consumed as the polycondensation proceeds and that the water contained in the sulfur source is turned into a free state and as a result serves as readily proceeding with dehydration. Hence, in the present invention, there is any loss of the organic polar solvent and the dihalogenated aromatic compound during dehydration. This is different from conventional techniques in which a lot of loss of the organic polar solvent and the dihalogenated aromatic compound during dehydration.

Polyarylene Sulfides

The polyarylene sulfides resulting from the polycondensation performed together with dehydration may be isolated by separating it directly from a reactor by a standard method such as filtration or centrifugal separation or by separating it from the reaction mixture after addition of water and/or a flocculating agent such as a dilute acid.

The separated polymer is then washed usually with water, NMP, methanol, acetone, benzene, toluene, or the like to remove the alkali metal halide, alkali metal sulfide, polymerization aid or promoter, by-products and the like which adhere to the polymer. The resulting polymer may be recovered by removing the solvent from the reaction mixture without separation therefrom and by washing the residue in the same manner as above. The solvent recovered may be reused.

As have been described hereinabove, the present invention can readily and stably provide the polyarylene sulfides, such as polyphenylene sulfides, which are substantially linear and which have a sufficiently high molecular weight and purity, by a simplified step.

If required, the polyarylene sulfides resulting from the process according to the present invention can be subjected to a variety of desalting treatment, thereby reducing the salt content, such as sodium chloride, in the polymer to a lesser extent.

The polyarylene sulfides prepared by the process according to the present invention may be formed into various products by formulating them with an appropriate amount of other polymers, pigments, fillers such as graphite, metallic powder, glass powder, quartz powder, glass fibers, carbon fibers and whiskers, a stabilizer, a lubricant or the like. The polyarylene sulfides resulting from the process according to the present invention can appropriately used for various molding materials and materials for films, fibers, mechanical parts, electrical parts, and so on.

The present invention will be described more in detail by way of examples with reference to comparative examples. It is to be understood, however, that the present invention is not considered in any respect to be limitative to the examples.

EXAMPLE 1

A 10-liter autoclave with a distillating tower was charged with 1,370 grams (8.148 moles) of sodium sulfide pentahydrate, 4,560 ml of N-methylpyrrolidone (NMP), and 1,198 grams (8.14 moles) of p-dichlorobenzene. The autoclave was gradually heated under ambient atmosphere to 110° C. and reflux started at the point of time just past 110° C. Then the polycondensation was carried out, together with dehydration, at the temperature of 220° C. and the pressure of 2 kg/cm, for 1 hour and at the temperature of 260° C. and the pressure of 4 kg/cm$^2$ for 3 hours, by using a pressure gauge and a control valve connected thereto. It was found that water and NMP were retained in the respective amounts of 689 grams and 170 grams in the receiver tank.

After the autoclave was cooled and opened, the resulting product was washed several times with water and acetone and then dried in vacuum for one day, thereby giving a 93% yield of polyphenylene sulfide (PPS) having a logarithmic viscosity number $[\eta_{inh}]$ of 0.18.

EXAMPLE 2

The procedure of Example 1 was followed except that 345.5 grams (8.148 moles) of lithium chloride was added and a preliminary dehydration of the content in the autoclave was carried out under reduced pressure as low as 100 Torr at 100° C.

As a result, it was found that the receiver tank contained 688 grams of water and 172 grams of NMP.

The resulting PPS was produced in a 88% yield and had a logarithmic viscosity number $[\eta_{inh}]$ of 0.36.

EXAMPLE 3

The procedure of Example 2 was followed except for using 932 grams (8.148 moles) of a 49% (by weight) aqueous solution of sodium hydrosulfide and 1,133.7 grams (8.148 moles) of sodium N-methylaminobutyrate, in place of sodium sulfide pentahydrate.

It was found that 430 grams of water and 108 grams of NMP were retained in the receiver tank.

The PPS was obtained in a 95% yield and found to have a logarithmic viscosity number $[\eta_{inh}]$ of 0.34.

COMPARATIVE EXAMPLE 1

The following experiment was carried out by basically following U.S. Pat. No. 3,354,129.

The autoclave was charged with 1,370 grams (8.148 moles) of sodium sulfide pentahydrate and 4,160 ml of NMP and heated to 200° C. in a stream of nitrogen gas to thereby distillate 1,830 ml of the mixture of 580 ml of water and NMP.

After the residue in the autoclave was cooled to 100° C., a solution of 1,198 grams (8.148 moles) of p-dichlorobenzene in 1,500 ml of NMP was added to the residue. Thereafter, the autoclave was heated to 260° C. and polycondensation was carried out for 3 hours.

The autoclave was then cooled to room temperature and the resulting product was washed several times with water and acetone. The product was then dried in vacuum for one day, thereby leaving PPS in a 92% yield. It was found that the resulting PPS had a logarithmic viscosity number $[\eta_{inh}]$ of 0.15.

COMPARATIVE EXAMPLE 2

The procedure of Comparative Example 1 above was followed except for adding lithium chloride prior to dehydration (distillation), thereby producing PPS in an 88% yield, which has a logarithmic viscosity number $[\eta_{inh}]$ of 0.27.

As a result of comparison of Example 1 with Comparative Example 1 it was found that Example 1 has provided the polyarylene sulfide can merely by simultaneously carrying out polycondensation together with dehydration, i.e., by a simplified step, while Comparative Example 1 has provided the polyarylene sulfide having substantially the same molecular weight as that of Example 1 by means of an extremely laborious and complicated operation consisting of dehydrating a mixture of sodium sulfide pentahydrate and NMP, cooling the dehydrated mixture, adding p-dichlorobenzene to the dehydrated mixture, and then carrying out polycondensation.

As described hereinabove, the process according to the present invention involves polycondensation of the dihalogenated aromatic compound with the sulfur source in the organic polar solvent while dehydrating under the pressure for polycon-densation, so that it can achieve a sufficient degree of dehydration as compared with conventional dehydration method. Furthermore, the process according to the present invention can perform polycondensation highly effectively, together with dehydration, with a simplified operation and system. The process of the present invention can further prevent by-production of undesirable products such as phenol and provide the polyarylene sulfides with a sufficiently high molecular weight.

What is claimed is:

1. A process for preparing a polyarylene sulfide of increased molecular weight comprising admixing a dihalogenated aromatic compound and an undehydrated source of sulfur containing up to 9 moles of water per mole of said source of sulfur in an organic polar solvent without dehydration, and then polycondensing said dihalogenated aromatic compound and said source of sulfur while substantially simultaneously dehydrating the reaction mixture in a single reaction zone under the pressure and temperature at which said polycondensation is performed wherein said pressure and temperature are escalated during said polycondensation and dehydration in a stepwise manner.

2. A process as claimed in claim 1, wherein the source of sulfur is an alkali metal sulfide, an alkali metal hydrosulfide or hydrogen sulfide.

3. A process as claimed in claim 1, wherein the source of sulfur is a hydrous alkali metal sulfide.

4. A process as claimed in claim 1, wherein the dihalogenated aromatic compound is a dihalobenzene.

5. A process as claimed in claim 1, wherein the dihalogenated aromatic compound is p-dichlorobenzene.

6. A process as claimed in claim 1, wherein the organic polar solvent is a non-protonic organic solvent.

7. A process as claimed in claim 1, wherein the organic polar solvent is a lactam.

8. A process as claimed in claim 1, wherein the organic polar solvent is a pyrrolidone.

9. A process as claimed in claim 1, wherein the pressure ranges from 2 to 10 kg/cm$^2$.

10. A process as claimed in claim 1, wherein polycondensation is carried out at temperature ranging from 220° C. to 300° C.

11. In a process for preparing a polyarylene sulfide of increased molecular weight by polycondensing a dihalogenated aromatic compound with a source of sulfur which process comprises first dehydrating said source of sulfur and then polycondensing such dehydrated source of sulfur with said aromatic in an organic polar solvent, the improvement comprising:

admixing said dihalogenated aromatic compound, an undehydrated source of sulfur, and said organic solvent;

polycondensing said dihalogenated aromatic compound with said undehydrated source of sulfur in said organic polar solvent while substantially simultaneously dehydrating the reaction mixture under a stepwise escalating pressure up to 2 to 10 kg/cm$^2$ and at a stepwise escalating temperature up to 220° C. to 300° C.; and recovering said polycondensate from said reaction zone.

12. The process as claimed in claim 1 wherein said source of sulfur contains up to about 1.2 moles of water per mole, water is added to the reaction mixture, and said polycondensation and said dehydration are carried out batchwise in a single reaction zone.

13. The process as claimed in claim 1 wherein said source of sulfur contains at least about 1.2 moles of water per mole of sulfur containing compound.

14. A process for preparing a polyarylene sulfide of increased molecular weight consisting essentially of polycondensing a batch of dihalogenated aromatic compound with a source of sulfur containing water in an organic polar solvent in a single reactor while dehydrating the reaction mixture under the pressure at which the polycondensation is carried out wherein said polycondensation and dehydration are carried out under stepwise increasing pressure conditions.

15. A process for preparing a polyarylene sulfide having increased molecular weight comprising polycondensing a reaction mixture of a dihalogenated aromatic compound and a source of sulfur containing water in an organic polar solvent, while substantially simultaneously dehydrating the reaction mixture under conditions including pressure and temperature, at which said polycondensation and dehydration is performed wherein said pressure and said temperature are increased during the course of said reaction.

* * * * *